(12) United States Patent
Yang et al.

(10) Patent No.: US 7,410,394 B2
(45) Date of Patent: Aug. 12, 2008

(54) LATCHING MECHANISM FOR SURFACE CONTACT CARD

(75) Inventors: Qing Yang Yang, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 183 days.

(21) Appl. No.: 11/384,470

(22) Filed: Mar. 20, 2006

(65) Prior Publication Data

US 2006/0270456 A1 Nov. 30, 2006

(30) Foreign Application Priority Data

May 28, 2005 (CN) .......................... 2005 1 0034956

(51) Int. Cl.
*H01R 24/00* (2006.01)
(52) U.S. Cl. ....................... 439/630; 235/475
(58) Field of Classification Search ......... 439/630–632; 235/475
See application file for complete search history.

(56) References Cited

U.S. PATENT DOCUMENTS

| 5,146,069 | A | * | 9/1992 | Orimoto et al. | ............. 235/475 |
| 5,905,252 | A | * | 5/1999 | Magana | ...................... 235/475 |
| 6,200,166 | B1 | * | 3/2001 | King | .......................... 439/630 |
| 2005/0136712 | A1 | * | 6/2005 | Katayanagi et al. | ......... 439/139 |

* cited by examiner

*Primary Examiner*—Truc T Nguyen

(57) ABSTRACT

A latching mechanism (200) for a surface contact card, used in a portable electronic device, includes a receiving cavity (11) defined in a body (10) and a latch module (12). The body defines a receiving cavity configured for receiving the surface contact card therein, and including a connector disposed in the receiving cavity. The latch module is mounted adjacent the receiving cavity, the latch module including a supporting portion and a rotating bar pivotably supported on the supporting portion. The latch module includes a supporting portion (13) and a rotating bar (300). The rotating bar includes an elastic member surroundingly formed thereon, the elastic member (302) being configured for providing a sufficient friction force to drive the surface contact card to move into or out the receiving cavity upon being pressed against the surface contact card.

17 Claims, 5 Drawing Sheets

LATCHING MECHANISM FOR SURFACE CONTACT CARD

BACKGROUND OF THE INVENTION

1. Field of the Invention

The present invention generally relates to mechanisms for holding surface contact cards of portable electronic devices and, particularly, to a latching mechanism for holding a SIM card in a portable electronic device.

2. Discussion of the Related Art

With the development of wireless communication and information processing technologies, portable electronic devices such as mobile phones are now in widespread use. These electronic devices enable consumers to enjoy the convenience of high-tech services anytime and anywhere. Surface contact cards such as subscriber identity module card (SIM), compact flash card (CF) and multimedia card (MMC) having special circuits are widely used in probable electronic devices to enhance or specialize the functions of the portable electronic devices. For example, a subscriber identity module card (SIM) is placed in a mobile phone to dedicate the mobile phone functions to the SIM card owner. By changing SIM cards, a single mobile phone can be used by many different SIM card owners as a personal phone.

Referring now to FIG. 1, a conventional mechanism for holding a SIM card includes a base 32 made of insulating material and a latching structure 34. The base 32 defines a receiving groove 321 and a SIM connector 30 comprising a plurality of contacts is set in the middle of the receiving groove 321. The size of the receiving groove 321 is the same as that of a SIM card. The latching structure 34 is located adjacent to one end of the receiving groove 321, and can be moved back and forth along the direction as indicated by the arrow shown in FIG. 1.

In use, firstly, the latching structure 34 is moved away from the receiving groove 321 and the SIM card is received in the receiving groove 321. Then, the latching structure 34 is moved adjacent to the receiving groove 321 for latching the SIM card in the receiving groove 321. In the same way, the SIM card can be released by moving the latching structure 34 away from the receiving groove 321.

In the above conventional mechanism for holding a SIM card, the latching structure 34 can be easily moved. If a mobile phone employing such a mechanism for holding a SIM card drops to ground, a shock will easily force the latching structure 34 to move off the receiving groove 321. As a result, the SIM card will not connect well with the SIM contactor 30 or even be released from the receiving groove 321. Obviously, such a conventional mechanism can not hold the SIM card steadily in the receiving groove 321.

Therefore, there is a need for a new latching mechanism for a SIM card, which can hold a SIM card steadily in a portable electronic device.

SUMMARY OF THE INVENTION

The present latching mechanism for a surface contact card includes a body and a latch module fixed on the body. The body defines a receiving cavity configured for receiving the surface contact therein, and including a connector disposed in the receiving cavity. The latch module is mounted adjacent the receiving cavity, the latch module comprising a supporting portion and a rotating bar pivotably supported on the supporting portion. The rotating bar includes an elastic member surroundingly formed thereon, the elastic member being configured for providing a sufficient friction force to drive the surface contact card to move into or out the receiving cavity upon being pressed against the surface contact card.

Other advantages and novel features of the present stylus removal mechanism will become more apparent from the following detailed description when taken in conjunction with the accompanying drawings.

BRIEF DESCRIPTION OF THE DRAWINGS

Many aspects of the latching mechanism for a surface contact card can be better understood with reference to the following drawings. The components in the drawings are not necessarily to scale, the emphasis instead being placed upon clearly illustrating the principles of the present latching mechanism for a surface contact card. Moreover, in the drawings, like reference numerals designate corresponding parts throughout the several views.

DETAILED DESCRIPTION OF THE EMBODIMENTS

Figure 1:
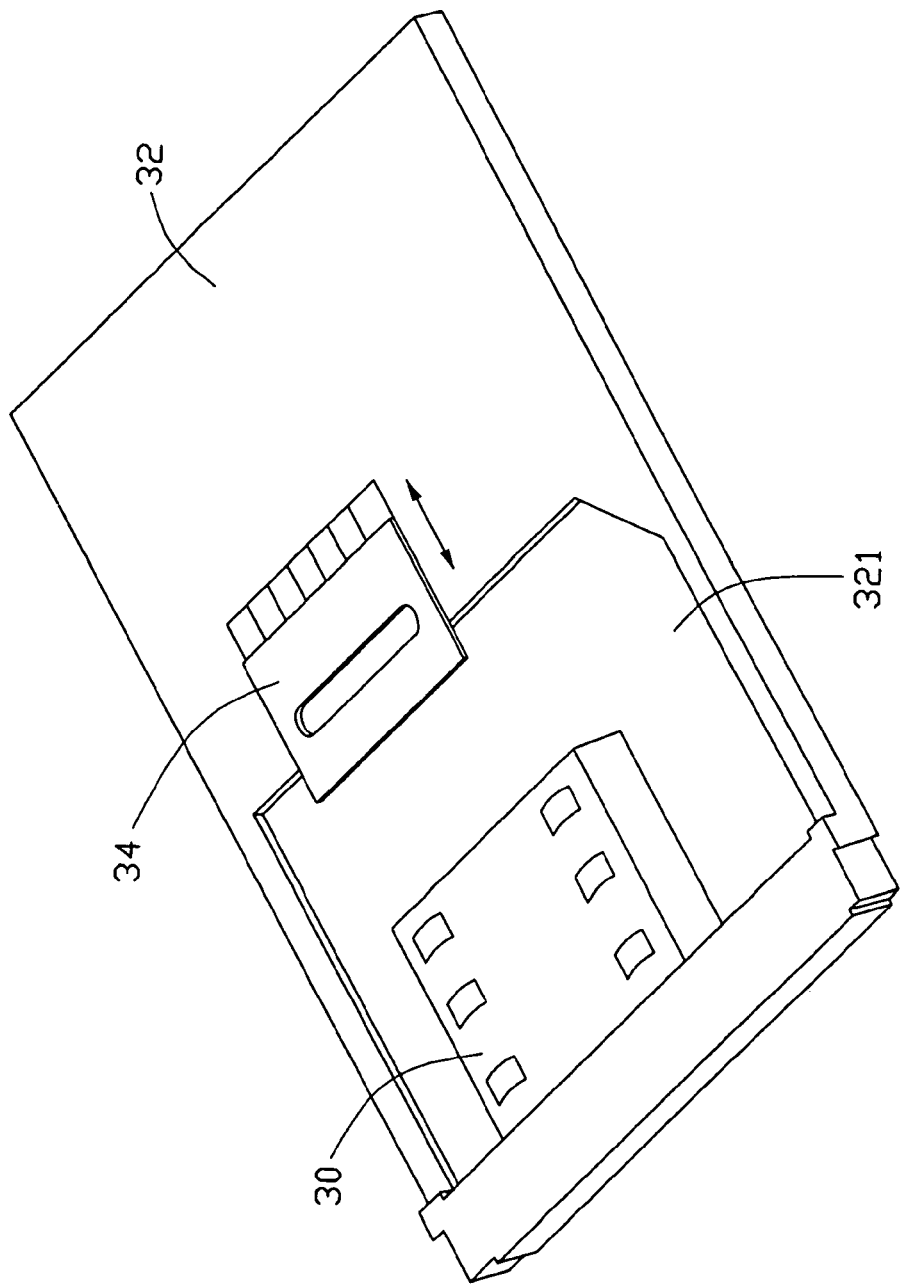
FIG. 1 is an exploded, isometric view of a conventional latching mechanism for a surface contact card.
Figure 2:
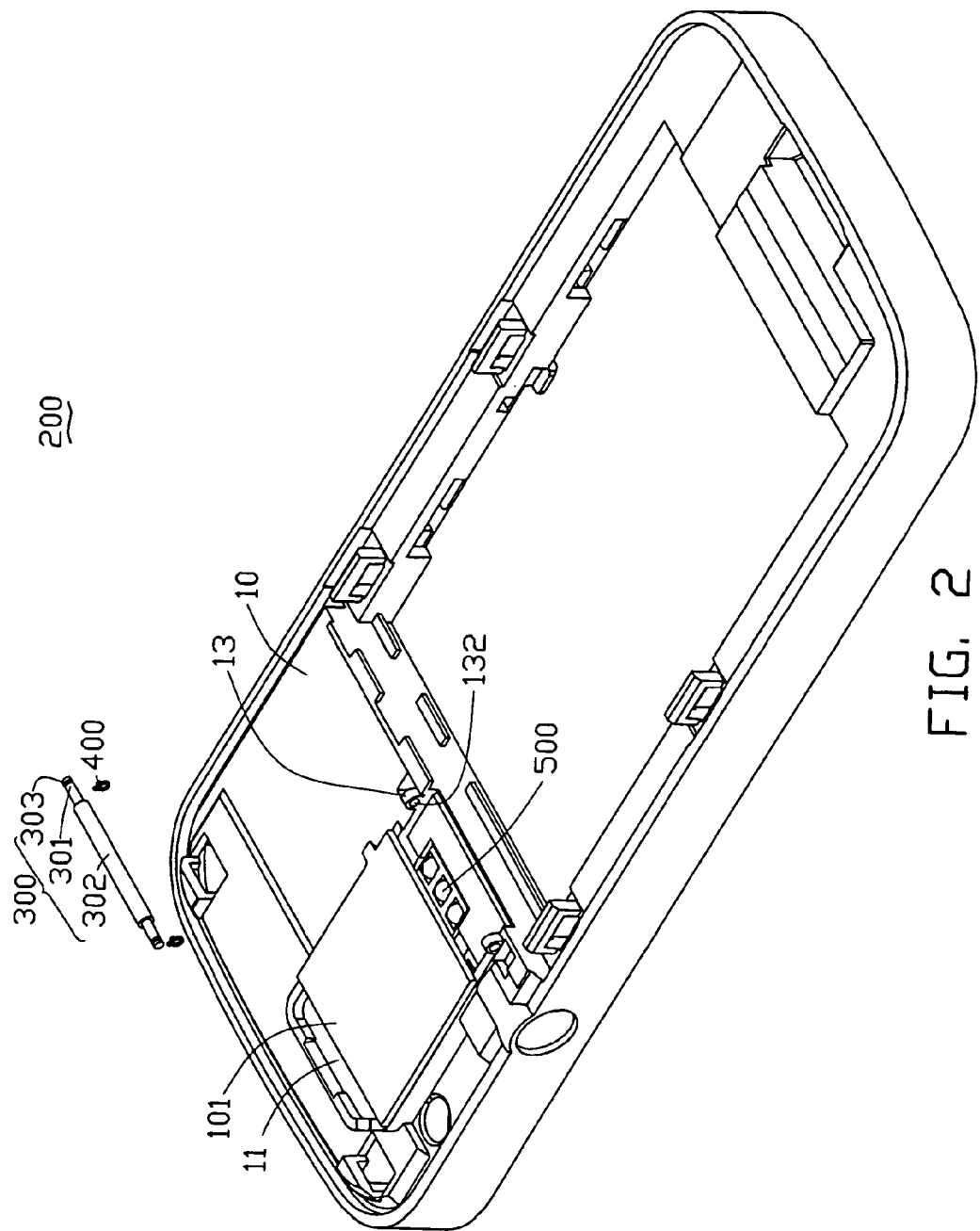
FIG. 2 is an exploded, isometric view of the latching mechanism for a surface contact card, in accordance with a preferred embodiment of the present latching mechanism for a surface contact card.
Figure 3:
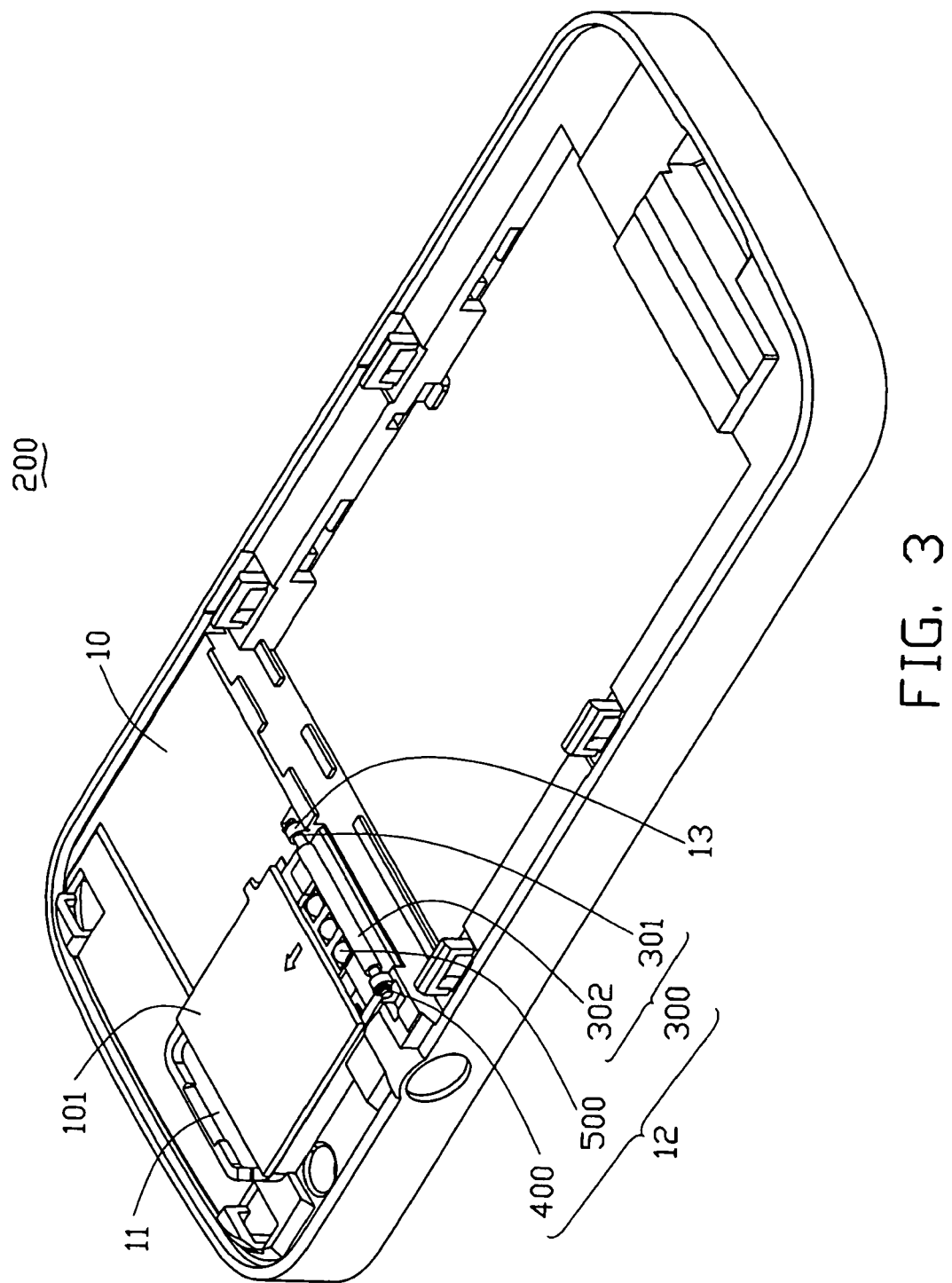
FIG. 3 is an assembled view of FIG. 2.
Figure 4:
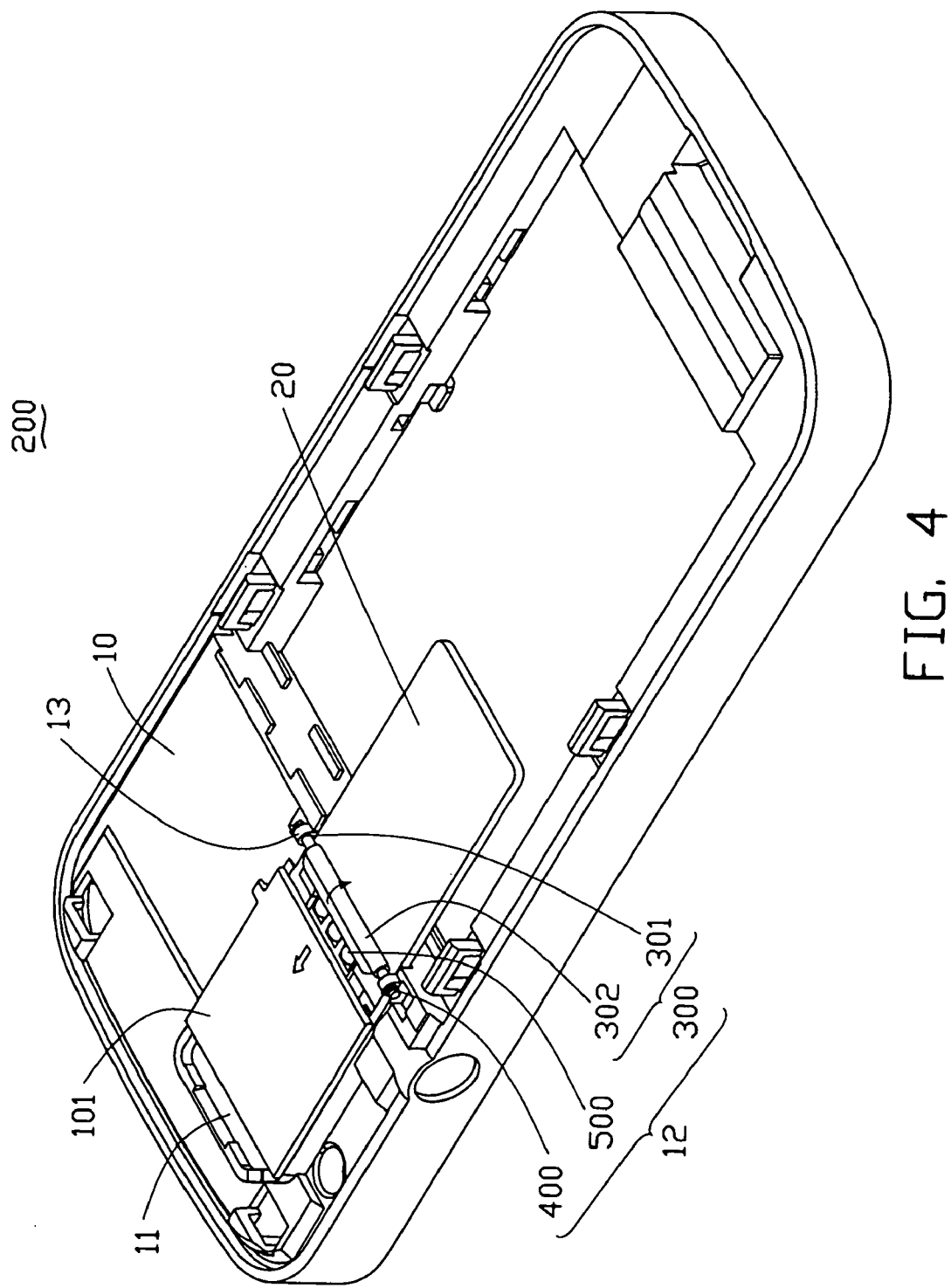
FIG. 4 is a view showing a surface contact card in a process of being assembled to the latching mechanism of FIG. 3.

Referring now to FIGS. 2-4, a latching mechanism 200 for a surface contact card includes a receiving cavity 11 defined in a body 10 and a latch module 12. In this embodiment, the surface contact card is a SIM card 20.

The receiving cavity 11 is a receiving space for receiving the SIM card 20, and the size of the receiving cavity 11 is the same as that of the SIM card 20. A SIM card connector (not shown) is set in the middle of the receiving cavity 11. A plate 101 protrudes from the body 10 for partially covering the receiving cavity 11 so that the SIM card 20 is held in the receiving cavity 11. One end of the receiving cavity 11 forms an entrance (not labelled) via which the SIM card 20 can enter or exit.

The latch module 12 is fixed on the body 10 adjacent to the entrance of the cavity 11. The latch module 12 includes a supporting portion 13, a rotating bar 300, two clips 400, and a plurality of rolling balls 500. The supporting portion 13 includes two supporting members. A distance between the two supporting members is same as the width of the SIM card 20. Each supporting member defines an engaging hole 132. The rotating bar 300 is cylinder-shaped and made of metallic material. Each end of the rotating bar 300 has an engaging portion 301 for pivotably engaging in the engaging hole 132. The rotating bar 300 has a middle portion surrounded by a layer of elastic member 302 with a certain thickness and width between the two engaging portions 301. The elastic member 302 is made of elastic material of high coefficient of friction such as fiber or rubber, so that the elastic member 302 is capable of providing sufficient friction force for driving the SIM card 20 out or into the receiving cavity 11 upon rotating the rotating bar 300. Each engaging portion 301 defines an annular peripheral slot 303, for engagingly receiving one of the clips 400. The clip 400 is C-shaped, and is made of an elastic material. In the preferred embodiment, the number of the rolling balls 500 is three. The rolling balls 500 are received in the body 10 adjacent to the entrance of the receiving cavity 11 and are rotatable relative to the body 10 when the SIM card 20 is being moved into the receiving cavity 11.

Figure 5:
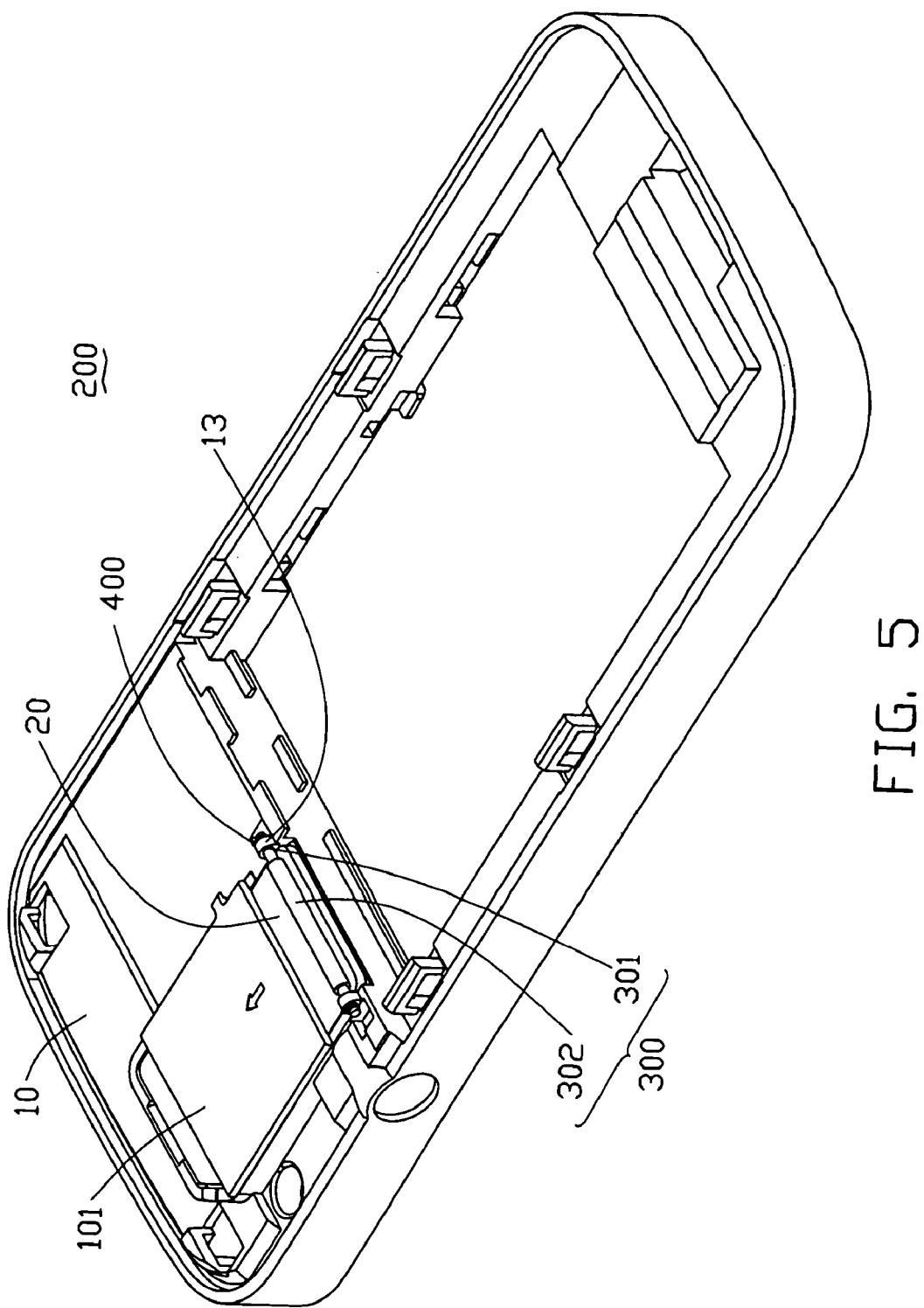
FIG. 5 is similar to FIG. 4, but showing a surface contact card fully assembled in the latching mechanism.

Referring to FIGS. 4-5, in assembly, firstly, one engaging portion 301 of the rotating bar 300 is inserted through the engaging hole 132 of one supporting member, and the other engaging portion 301 of the rotating bar 300 is inserted through the engaging hole 132 of the other supporting member, with the peripheral slots 303 of the engaging portions 301 located at outer sides of the supporting members respectively. Secondly, each clip 400 is attached around the engaging portion 301 at the peripheral slot 303 thereof, for preventing the rotating bar 300 from axially moving out from the engaging hole 132. Thus, the assembly of the latch module is accomplished.

In use, to mount the SIM card 20 in the receiving cavity 11, firstly, one end of the SIM card 20 is placed below the rotating bar 300, aligned with the entrance of the cavity 11. Because the elastic member 302 of the rotating bar 300 has a certain thickness, the elastic member 302 of the rotating bar 300 is elastically deformed and presses the SIM card 20. Then, the rotating bar 300 is pushed by hand so that the rotating bar 300 is rotated in the direction as indicated by the arrow in FIG. 4. As a result, the SIM card 20 is driven to move on the rolling balls 500 and into the receiving cavity 11 by friction force produced between the elastic member 302 and the SIM card 20. Because the rolling balls 500 can reduce the friction resistance against the moving SIM card 20, the SIM card 20 is easy to move into the receiving cavity 11. When the SIM card 20 is connected with the connector set in the middle of receiving cavity 11, the SIM card 20 stops moving. A part of the SIM card 20 that locates near the entrance of the cavity is still pressed by the elastic member 302 of the rotating bar 300, so that a static friction is generated between the elastic member 302 and the SIM card 20 to prevent withdrawal of the SIM card therefrom. Therefore, the SIM card 20 is latched in the receiving cavity 11.

To remove the SIM card 20, the rotating bar 300 is rotated reversely, i.e., in a direction opposite to the direction as indicated by the arrow. The SIM card 20 is driven to move out the receiving cavity 11 by the friction force produced between the elastic member 302 and the SIM card 20. When the SIM card 20 is moved out the entrance, the SIM card 20 can be readily taken out.

In an alternate embodiment, the plate 101 can be replaced by a plurality of holding piece 101 extending from the body 10. In addition, the plate 101 can be a discrete member fixed to the body 10 by fasteners such as bolts. The latching mechanism 200 can be used for other surface contact cards such as compact flash card (CF) and multimedia card (MMC). The rolling balls 500 can be omitted. Understandably, the presence of the rolling balls 500 is advantageous in that it can reduce resist against motion of the SIM card 20 in the receiving cavity 11.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A latching mechanism for a surface contact card comprising:
   a body defining a receiving cavity configured for receiving the surface contact card therein, and including a connector disposed in the receiving cavity;
   a latch module mounted adjacent the receiving cavity, the latch module comprising a supporting portion and a rotating bar pivotably supported on the supporting portion, the rotating bar comprising an elastic member surroundingly formed thereon, the elastic member being configured for providing a sufficient friction force to drive the surface contact card to move into or out the receiving cavity upon being pressed against the surface contact card; and
   at least one rolling ball rotatably received in the body, adjacent to the entrance of the receiving cavity.

2. The latching mechanism as claimed in claim 1, wherein the surface contact card is a SIM card.

3. The latching mechanism as claimed in claim 1, wherein a plate protrudes from the body for partially covering the receiving cavity.

4. The latching mechanism as claimed in claim 1, wherein the supporting portion comprises two supporting members, and a distance between the two supporting members is the same as the width of the surface contact card.

5. The latching mechanism as claimed in claim 1, wherein the rotating bar is cylinder-shaped and made of metallic material.

6. The latching mechanism as claimed in claim 1, wherein the elastic member is made of one of fiber and rubber.

7. The latching mechanism as claimed in claim 4, wherein each supporting member defines an engaging hole therein, and each end of the rotating bar has an engaging portion for engaging in the engaging hole.

8. The latching mechanism as claimed in claim 7, wherein each engaging portion defines a round slot, the latching mechanism includes two clips engaging in the round slots respectively.

9. The latching mechanism as claimed in claim 8, wherein each clip is C-shaped, and is made of an elastic material.

10. A latching mechanism for a card member, comprising:
    a body defining a receiving cavity configured for receiving the card member therein, the body including a connector disposed in the receiving cavity the connector being configured for electronically connecting with circuits of the card member when the card member is received in the receiving cavity;
    a rotating bar located adjacent the receiving cavity, the rotating bar being rotatable to drive the card member to move into or out the receiving cavity by friction produced between the rotating bar and the card member; and
    at least one rolling ball rotatably received in the body, adjacent to the entrance of the receiving cavity, the rolling ball being configured for reducing friction against the card member when the card member is moved.

11. The latching mechanism as claimed in claim 10, wherein a plate protrudes from the body for partially covering the receiving cavity and one end of the receiving cavity forms an entrance for receiving the card member.

12. The latching mechanism as claimed in claim 10, wherein the supporting portion comprises two supporting members, a distance between the two supporting members is the same as the width of the card member.

13. The latching mechanism as claimed in claim 12, wherein each supporting member defines an engaging hole therein, and each end of the rotating bar has an engaging portion rotatably engaging in the engaging hole.

14. A latch mechanism for a card member for a portable electronic device, the latch mechanism comprising:
- an electronic device body defining a receiving cavity therein, the receiving cavity being configured for receiving the card member therein, the receiving cavity having an cavity entrance;
- a rotating bar rotatably located adjacent the receiving cavity, the rotating bar being configured such that when the card member is disposed below the rotating bar and aligned with the cavity entrance, the rotating bar is capable of pressing the card member; and
- at least one rolling ball disposed between the entrance and the rotating bar for reducing friction resistance against motion of the card member.

15. The latching mechanism as claimed in claim 14, wherein the supporting portion comprises two supporting members, a distance between the two supporting members is the same as the width of the card member, each supporting member defines an engaging hole therein, and each end of the rotating bar has an engaging portion engaging in the engaging hole.

16. The latch mechanism as claimed in claim 14, wherein the rotating bar comprises a friction layer formed therearound for driving the card member to move by friction force produced between the friction layer and the card member upon rotating of the rotating bar.

17. The latch mechanism as claimed in claim 16, wherein the friction layer is configured to be elastically deformable when pressing the card member.

* * * * *